US007174653B2

(12) United States Patent
Mansfield

(10) Patent No.: US 7,174,653 B2
(45) Date of Patent: Feb. 13, 2007

(54) METHOD AND DEVICE FOR MARKING TRIM MITERS FOR A BULL-NOSE CORNER

(76) Inventor: Joel Mansfield, 2140 Pine St., #2, Boulder, CO (US) 80302

( * ) Notice: Subject to any disclaimer, the term of this patent is extended or adjusted under 35 U.S.C. 154(b) by 32 days.

(21) Appl. No.: 11/109,561

(22) Filed: Apr. 19, 2005

(65) Prior Publication Data

US 2006/0230626 A1 Oct. 19, 2006

(51) Int. Cl.
*G01B 3/14* (2006.01)

(52) U.S. Cl. ............................ 33/563; 33/526; D10/64

(58) Field of Classification Search .................. 33/562, 33/563, 565, 566, 526, 501, 474; D10/64, D10/65

See application file for complete search history.

(56) References Cited

U.S. PATENT DOCUMENTS 1,599,025 A * 9/1926 Magnuson ................... 33/194
3,726,327 A * 4/1973 Cormier ................ 144/144.51
3,834,033 A * 9/1974 Pinkard ........................ 33/563
5,396,710 A * 3/1995 Battaglia ...................... 33/429
D364,015 S * 11/1995 Stoltzfus ...................... D32/46
5,720,114 A * 2/1998 Guerin ........................ 33/451
5,749,154 A * 5/1998 Scharf .......................... 33/563
D411,672 S * 6/1999 McCoy et al. ............... D32/46
D420,687 S * 2/2000 Dragon ...................... D15/140
D426,474 S * 6/2000 Chang .......................... D10/65
D453,672 S * 2/2002 McCoy .......................... D8/90
6,935,039 B1 * 8/2005 Hess ........................... 33/562
2002/0100180 A1 * 8/2002 Montefusco ................ 33/563

FOREIGN PATENT DOCUMENTS

JP 08090993 A * 4/1996

* cited by examiner

*Primary Examiner*—R. Alexander Smith
(74) *Attorney, Agent, or Firm*—Ruth Eure

(57) ABSTRACT

A method and device for marking trim miters for a bull-nose corner is provided. Embodiments for wainscotting, crown molding and baseboard are also disclosed. The device comprises a molded, hand-held structure which envelopes a portion of the bull-nose corner and provides marking guides for marking correct placement of trim. The method discloses utilization of the device.

14 Claims, 3 Drawing Sheets

METHOD AND DEVICE FOR MARKING TRIM MITERS FOR A BULL-NOSE CORNER

FIELD OF THE INVENTION

This invention relates to the field of carpentry tools, and more specifically to the field of measuring and marking tools used for determining the appropriate length of trim, particularly, interior trim.

BACKGROUND OF THE INVENTION

The building industry is very dynamic in that new and improved methods and tools are continuously being developed to meet the challenge of building high quality, attractive finished buildings with speed, accuracy and economy.

The construction industry has experienced various trends and styles over time, and currently, the use of rounded corners, also known as bull-nose corners have become very popular. When interior trim such as chair-molding, wainscotting, crown molding and baseboard are to be installed, the carpenter is met with the challenge of quickly and accurately determining the length of trim to cut. Bull nosed or rounded corners present a particular challenge since the trim to be cut is invariable essentially straight, and the corner to be trimmed is rounded. A series of sectional pieces of trim must be constructed to fit snugly against the rounded corner. The present invention provides a device which allows the carpenter to determine the length of trim to be cut with ease, accuracy and efficiency. Use of the present invention eliminates the likelihood of unsightly gaps in constructing trim for bull nose corners. Aligning and assembling the bull nose corner end molding piece with the other molding pieces involves significant precision and laborious and time-consuming measurement and cutting to ensure that the pieces fit together properly.

Of the many marking and measuring tools known to exist, only one was found which is specifically adapted for marking trim location for a bull-nose corner. That patent, namely U.S. Pat. No. 5,749,154 to Scharf describes a Bull Nose Corner Marking Apparatus which functions in a very different manner than the invention of the present invention. The device of Scharf resembles a carpenter's square, which describes the essentially right angle of the corner to be trimmed. In the device of Scharf, the trim is placed against the wall, and the device is placed on top of the edge of the trim, and the TRIM is marked along an inset edge of the device. The device of the present invention, in contrast, is designed to make a mark on the WALL. If the device of Scharf were to be used to place marks on walls, the marks would be necessarily be drawn "free-hand," and therefore likely not parallel. The Scharf device also would be prone to non-level positions, since it is essentially flat and describes a plane. Additionally, it would be necessary for the user to hold the device in the correct position with one hand, while making marks with the other.

The present invention, by contrast, although requiring two hands, assures the position of level, straight and parallel marks because it fits snugly against the corner and provides extended marking guides. The present invention is also an improvement over the Scharf device because it is more lightweight and faster and easier to use.

The present invention provides an improved device and method for marking the location of trim for bull-nose and rounded corners.

SUMMARY OF THE INVENTION

It is an object of the present invention to provide an improved device for marking trim location for bull-nose corners.

It is a further object of the present invention to provide an improved method for marking the location of trim on a wall having a bull-nose corner.

It is a further object of the present invention to provide an improved method to measure interior trim and woodwork of varying width, thickness and style.

The device of the present invention comprises a lightweight, easy to carry, fast, accurate device for marking location of trim on a rounded or bull nose corner.

It is a still further object of the present invention to provide a device for marking trim for a bull nose corner which is flexible and durable.

The elements illustrated in the figures are listed in the following Table.

| | |
|---|---|
| Element 2 | cross-piece |
| Element 4 | flange |
| Element 6 | flange |
| Element 8 | marking guide |
| Element 10 | marking guide |
| Element 12 | mid-section |
| Element 14 | mid-section |
| Element 16 | internal area |
| Element 18 | edge thickness of flange |
| Element 20 | length of cross-piece |

DESCRIPTION OF THE INVENTION

Figure 2:
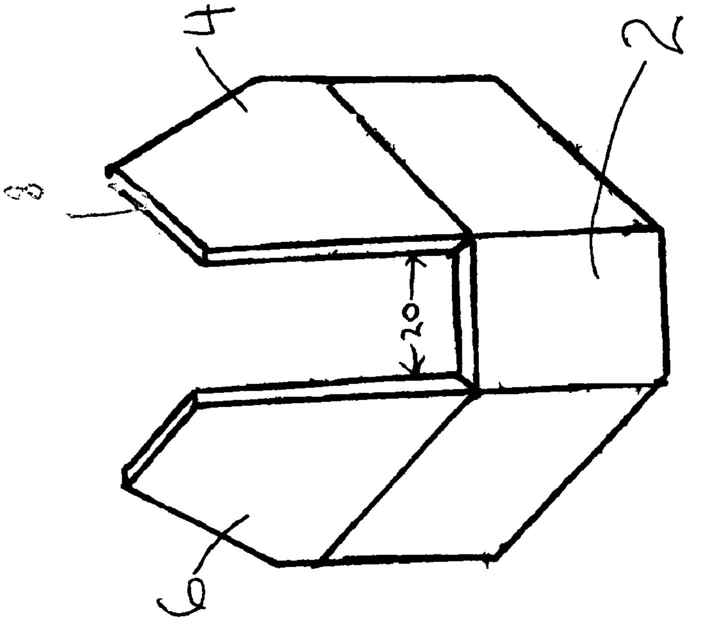
FIG. 2 is a front perspective view of an alternative embodiment of the present invention.
Figure 1:
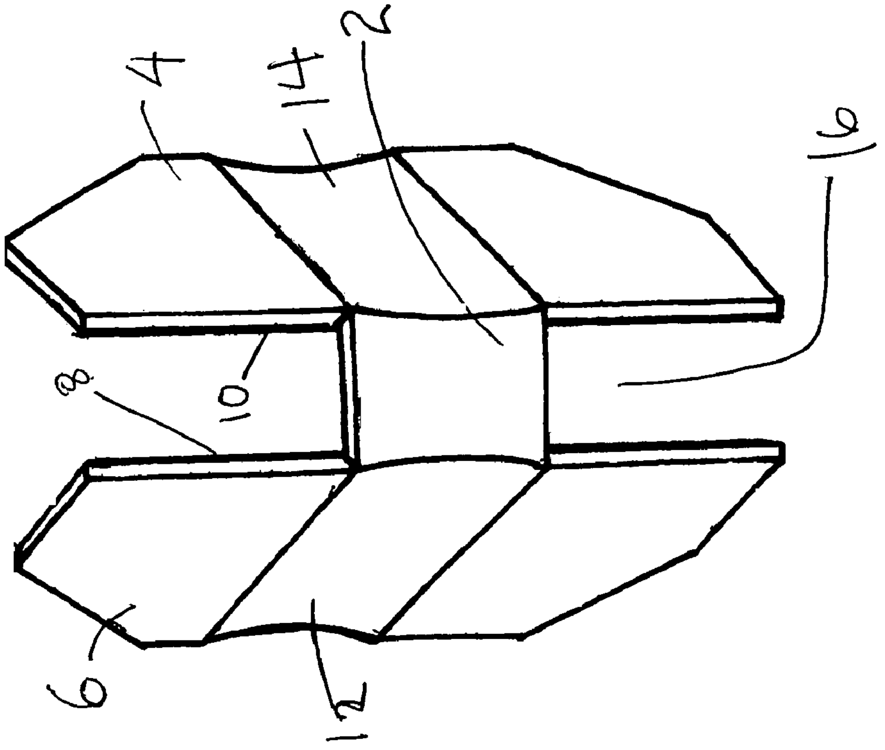
FIG. 1 is a front perspective view of one embodiment of the present invention.
Figure 3:
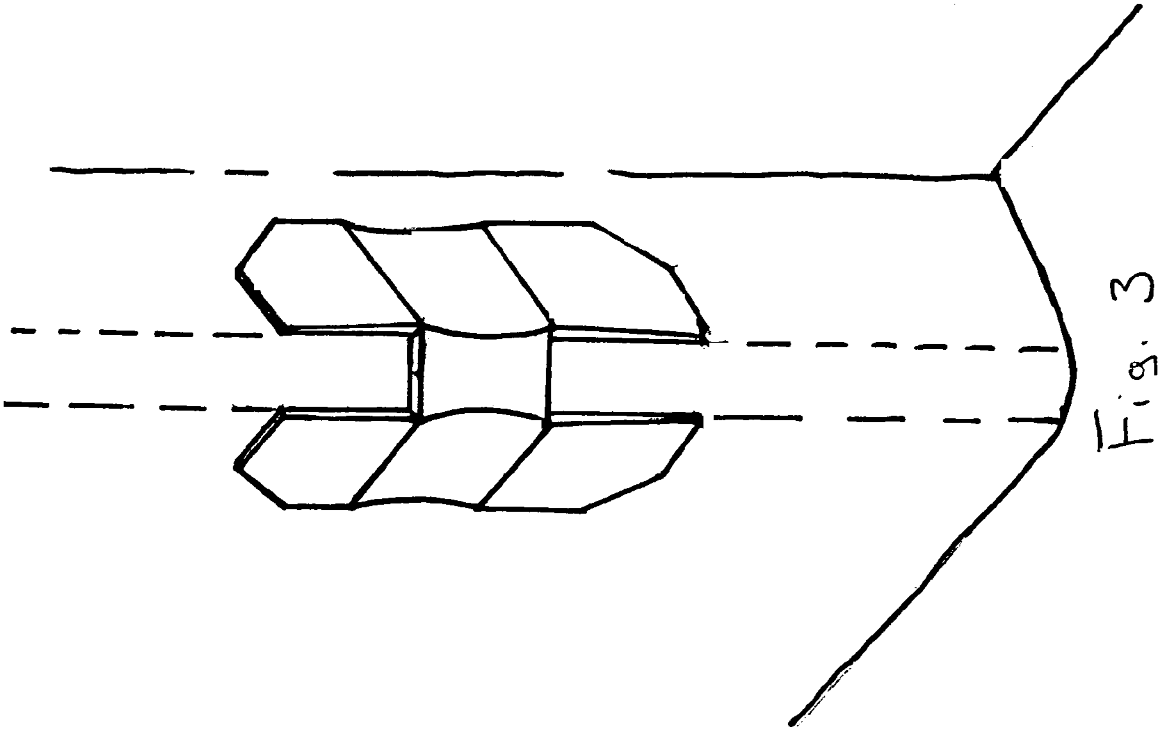
FIG. 3 shows the present invention illustrated in FIG. 1 in place against a wall.

The present invention provides a corner marking apparatus used for easy and accurate marking of intersection lines of miters for interior trim moldings around bull-nose and radius rounded corners. The present invention comprises a small hand held device that is held against the bull-nose corner of a wall. The device consists of two flanges 4 and 6, each of which extend from a cross-piece 2 at an angle of 135°. The length 20 of the cross-piece (shown in FIG. 2) is dimensioned to appropriately fit the inside radius of curvature of the bull nose corner. This is typically ⅝ths of an inch or 11⁄16ths of an inch, for example. The cross-piece needs to be wide enough to accommodate being held by user's thumb and forefinger. The flanges 4, 6, are wider than the cross-piece 2 to provide marking guides 8, 10. One embodiment comprises flanges extending both upward and downward from the cross-piece to provide marking guides around a corner for trim such as wainscotting, for example. The internal area 16 is described by the inside edges of opposing flanges. The edges of the flanges which describe the internal area 16 serve as the marking guides 8, 10. This is shown in FIG. 1. FIG. 2 shows another embodiment comprising only one set of flanges 4,6 extending from the cross-piece 2 for marking trim such as crown molding and baseboard. The mid-section 12, 14 of the flanges 4, 6 may additionally describe a slightly concave surface to more comfortably and securely fit the thumb and fingers of the user. The length of the flanges is non-critical, but could be on the order of 1.5 inches or more, to provide a guide for making a line long enough to effectively measure the place on the trim to be cut. The flanges are wide enough so that a secure corner position can be maintained, but are narrow enough to accommodate tight transitions, as shown in FIG. 3, for example.

Figure 5:
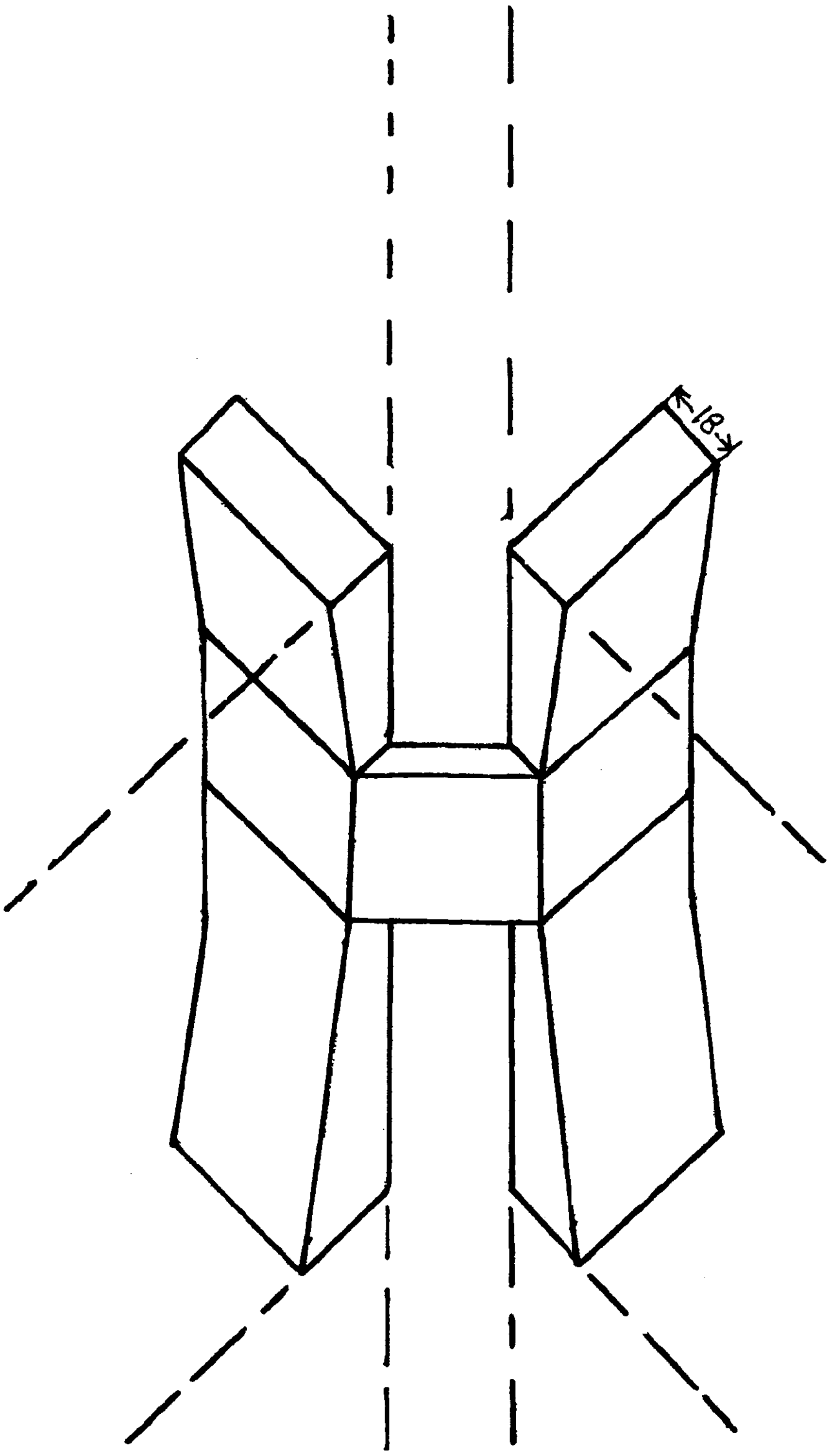
FIG. 5 shows yet another alternative embodiment of the present invention in place to make marks for crown molding or baseboard.

In an embodiment, the thickness of the flanges 4,6 may taper from their juncture with the mid-section 12,14 to a narrower thickness at the edges. In an alternative embodiment, the thickness of the flanges may taper from its juncture with the mid-section 12,14 to a greater thickness at the edges for the purpose of measuring and marking the length of crown molding or baseboard and marking the ceiling or floor for receiving such molding. The flange edge thickness 18 varies according the use of the device. If the edge is to be used as a marking guide for crown molding and baseboard, the flange edge thickness 18 is greater to provide a suitable marking guide for marking the ceiling or floor, as shown in FIG. 5. This thickness is on the order of about ¼ inch, or greater.

In operation, the device of the present invention is positioned against the bull-nosed or radius corner and marks are made on the wall by placing a marking device such as a pencil, for example, along the marking guides 8,10. This is shown in FIG. 3. The device is removed and the trim is then positioned on the wall, and marks are made on the trim, which correspond to the marks on the wall. The mark designates the exact location where the trim requires a miter. The trim is then removed, cut at the marks, and then permanently installed on the wall, by use of fastening means such as nails or screws, for example. The lines drawn using the device of the present invention can be of any length necessary, to correspond to various widths and styles of trim. Straight, accurate, consistent lines can be drawn from floor to ceiling, if necessary.

The device of the present invention can be made by any suitable means. However, which is durable, lightweight and flexible such as thermoplastic material, for example, may be most suitable.

Figure 4:
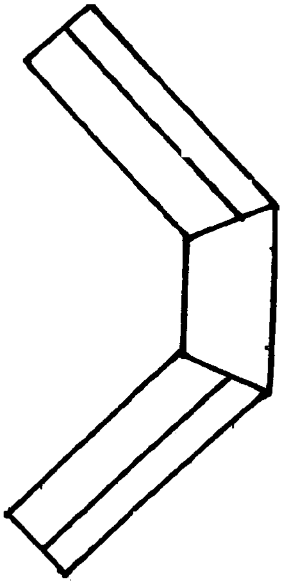
FIG. 4 is a top or bottom view of the device of the present invention.

FIG. 4 shows a top and bottom view of the device of the present invention. Since the device comprises two axes of symmetry, both from side to side and top to bottom, the top view is identical to the bottom view.

FIG. 5 shows yet another alternative embodiment of the present invention. The embodiment shown in FIG. 5 comprises thicker flanges which will allow miter marks to be drawn on ceiling and floor for crown moldings and baseboard as well as on a bull nose cornered wall.

Although this invention has been described with respect to specific embodiments as set forth in the foregoing description taken in conjunction with the drawings and the appended claims, it is to be understood that certain modifications will become apparent to the person of ordinary skill in the art, and that such modifications are intended to be included within the spirit and scope of the invention and are considered to be included herein as part of this invention.

The invention claimed is:

1. A device for marking trim miters for a bull-nose corner which fits against the outside diameter of a bull-nose corner essentially defining about a ninety degree angle comprising:

a cross piece which comprises an essentially rectangular member having a top edge, a bottom edge, a right side and a left side;

a right mid-section which creates an approximately 1350 angle with the right side of the cross-piece, the right mid-section is essentially rectangular having a top edge, a bottom edge, a right edge and a left edge, the left edge of the mid-section is attached to the right side of the cross-piece at a first juncture;

one flange having one edge attached to the top side of the right mid-section at a second juncture and lies in the same plane as the right mid-section;

a left mid-section which creates an approximately 1350 angle with the left side of the cross-piece, the left mid-section is essentially rectangular having a top edge, a bottom edge, a right edge and a left edge, the right edge of the mid-section is attached to the left side of the cross-piece at a third juncture;

a second flange having one edge attached to the top side of the left mid-section at a forth juncture and lies in the same plane as the left mid-section;

wherein the top edge of the first flange extending beyond the top edge of the cross-piece and the top edge of the second flange extending beyond the top edge of the cross-piece, so that the top edge of the cross piece and an inner edge of the first flange and an inner edge of the second flange create a u-shaped space, the perimeter of said u-shaped space defining a marking guide which can be traced with a marking device to create markings on the bull-nose corner to indicate where the trim should be placed.

2. The device of claim 1 further comprising a second set of flanges which are joined to and are below the respective left and right mid-sections.

3. The device of claim 2 wherein the first flange and the second flange both extend beyond the top edge of the cross-piece at least about 1.5 inches.

4. The device of claim 1 wherein the thickness of the flange decreases from the juncture with the mid-section to the outer edge of the flange.

5. The device of claim 1 wherein the thickness of the flange increases from the juncture with the mid-section to the outer edge of the flange.

6. The device of claim 1 wherein the surfaces of the right and left mid-sections define concave surfaces to facilitate receiving the digits of the user.

7. The device of claim 1 wherein the device is made from thermoplastic material.

8. The device of claim 7 wherein the thickness of the flange decreases from the juncture with the mid-section to the outer edge of the flange.

9. The device of claim 7 wherein the thickness of the flange increases from the juncture with the mid-section to the outer edge of the flange.

10. The device of claim 1 wherein the first flange extends beyond the top edge of the cross-piece at least about 1.5 inches.

11. The device of claim 1 wherein the dimensions of the first flange and the second flange are substantially the same.

12. The device of claim 1 wherein the thickness of the flange decreases from the juncture with the mid-section to the outer edge of the flange.

13. The device of claim 1 wherein the thickness of the flange increases from the juncture with the mid-section to the outer edge of the flange.

14. A method for marking the location of trim for a bull-nose corner comprising:

placing a device having a cross piece which comprises an essentially rectangular member having a top edge, a bottom edge, a right side and a left side further comprising:

one flange which has one edge attached to the right side of the cross-piece and creates a 1350 angle with the cross-piece;

a second flange having one edge attached to the left side of the cross-piece and creates a 1350 angle with the cross piece;

wherein a top edge of the first flange extends beyond the top edge of the cross-piece and the top edge of the second flange extends beyond the top edge of the cross-piece, so that the top edge of the cross piece and an inner edge of the first flange and an inner edge of the second flange create a u-shaped space, the perimeter of said u-shaped space defining a marking guide which can be traced with a marking device to create markings on the bull-nosed corner to indicate where the trim should be placed and mitered; against the bull nose corner;

holding the device in place with one hand and using a marking device to create markings on the wall by marking along the edge of the marking guide of the aforesaid device with the other hand.

* * * * *